United States Patent
Sabry

(10) Patent No.: US 8,481,141 B2
(45) Date of Patent: *Jul. 9, 2013

(54) FLEXIBLE VCD HAVING DOMED CENTER AND FLAT CENTRAL BOTTOM RING AND METHOD OF MAKING THEREOF

(76) Inventor: Mohamed Mohab Sabry, Rancho Cucamonga, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 12/467,173

(22) Filed: May 15, 2009

(65) Prior Publication Data

US 2009/0220724 A1    Sep. 3, 2009

Related U.S. Application Data

(63) Continuation-in-part of application No. 11/799,208, filed on Apr. 30, 2007, now Pat. No. 7,947,352, and a continuation-in-part of application No. 12/001,924, filed on Dec. 12, 2007, now Pat. No. 8,372,500.

(51) Int. Cl.
*G11B 7/24* (2006.01)
(52) U.S. Cl.
USPC ............. 428/64.1; 428/64.4; 430/270.11
(58) Field of Classification Search
USPC ................... 428/64.4; 430/270.11
See application file for complete search history.

(56) References Cited

U.S. PATENT DOCUMENTS

| | | | | |
|---|---|---|---|---|
| 5,999,513 | A | * 12/1999 | Arakawa et al. | 369/282 |
| 6,865,745 | B2 | * 3/2005 | Myrtle | 720/724 |
| 2003/0095497 | A1 | 5/2003 | Myrtle | 369/280 |
| 2003/0161255 | A1 | * 8/2003 | Kikuchi et al. | 369/280 |

FOREIGN PATENT DOCUMENTS

| EP | 5307769 | 11/1993 |
|---|---|---|
| WO | 9810418 | 3/1998 |

* cited by examiner

*Primary Examiner* — Elizabeth Mulvaney
(74) *Attorney, Agent, or Firm* — Steins & Associates, P.C.

(57) ABSTRACT

A Flexible VCD Having Domed Center and Flat Central Bottom Ring and Method of Making Thereof is disclosed. The disc will has a flat data storage section of its substrate that is less than 0.7 millimeters thick, while the central region of the disc is defined by a dome structure adjacent to the spindle aperture that is of standard digital disc thickness. The disc is thin enough such that its substrate is flexible. The dome structure is shaped to provide the widest compatibility with player/recorders, as well as with disc printing systems. Disc versions are available that provide conical dome structures, as well as slivered dome structures of both conical and rectangular cross-section, and a combined design having a plurality of raised protrusions on the top surface of the disc, and a flat central ring protruding from the bottom surface of the disc. The method for manufacturing the discs simply requires the replacement of the conventional stamper holder with a stamper holding having a non-flat face.

18 Claims, 15 Drawing Sheets

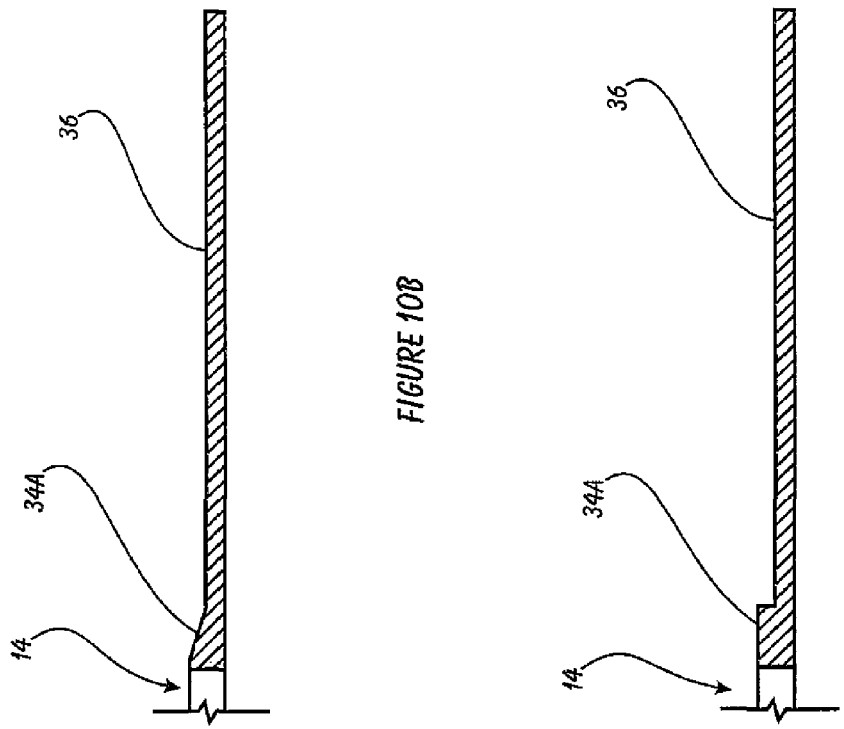
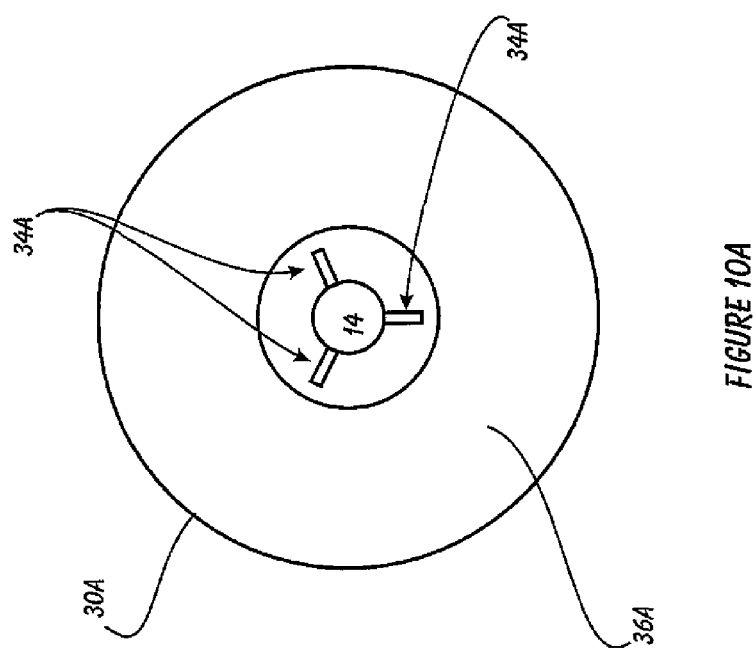

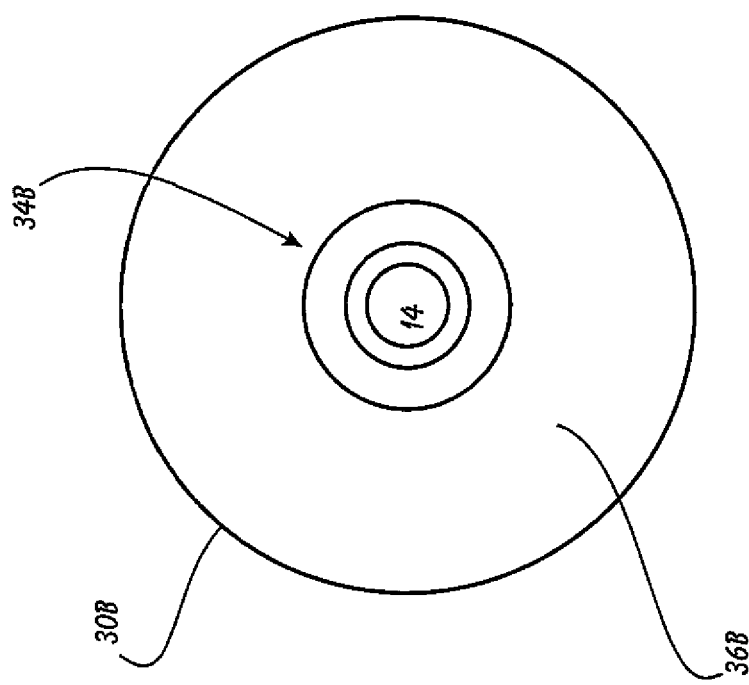
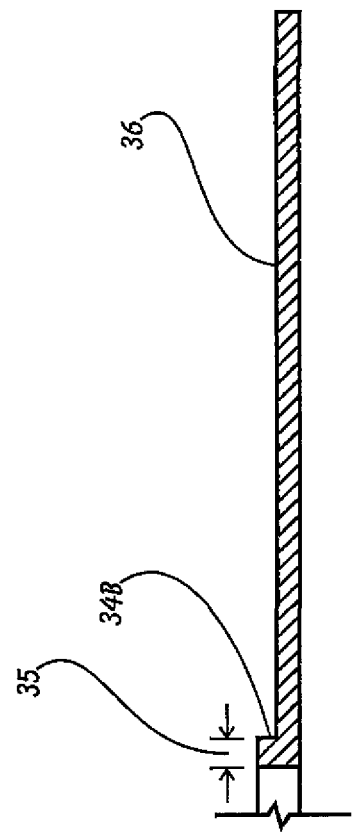
*FIGURE 11A*
*FIGURE 11B*

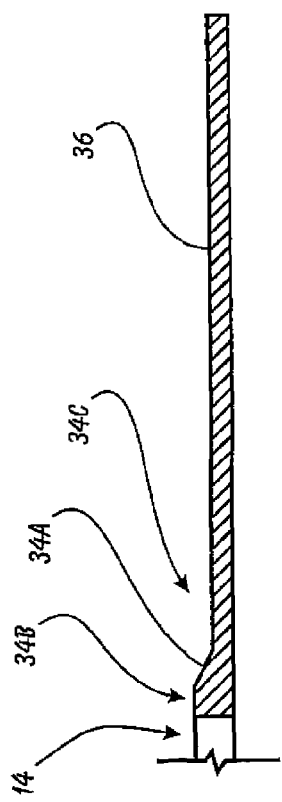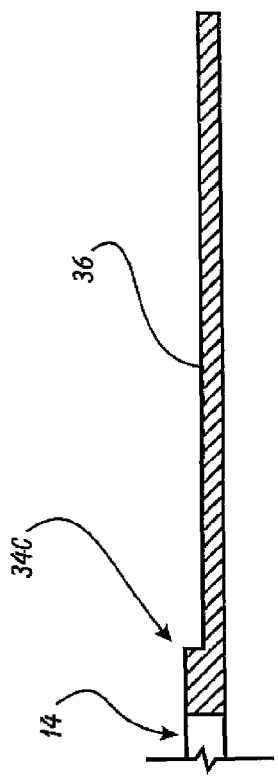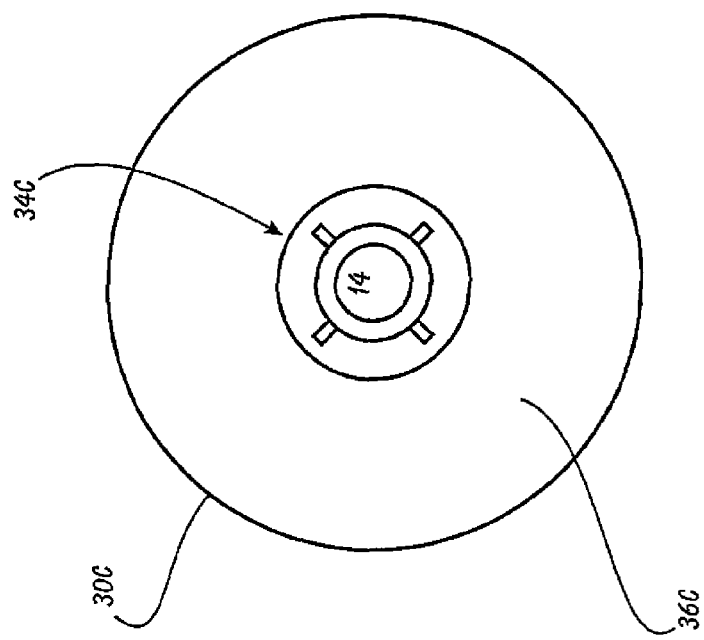
FIGURE 12B
FIGURE 12C
FIGURE 12A

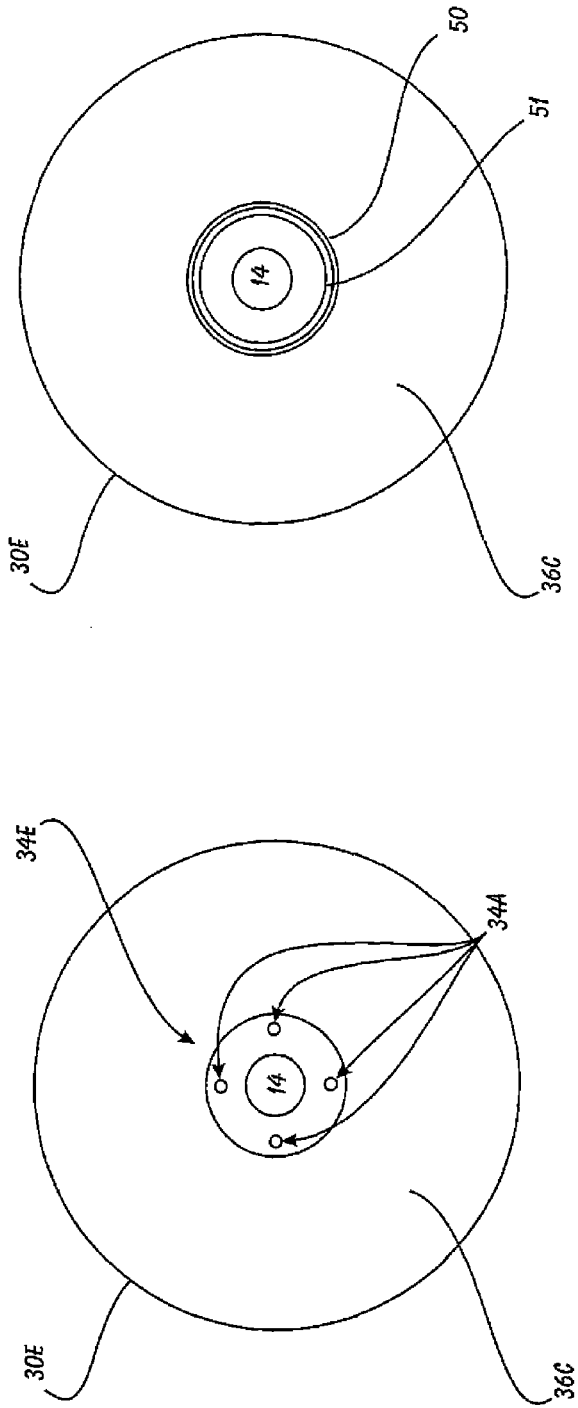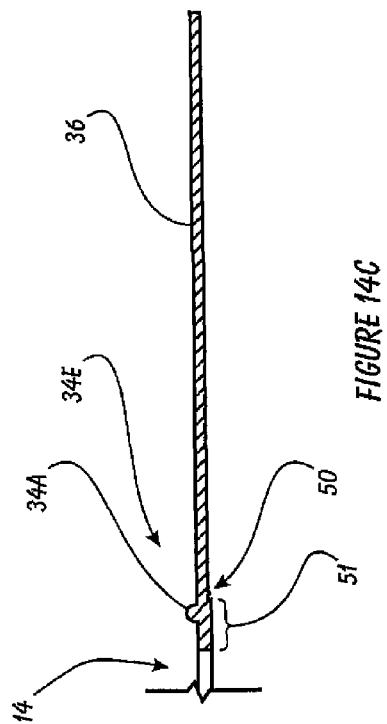
FIGURE 14B
FIGURE 14C
FIGURE 14A

US 8,481,141 B2

FLEXIBLE VCD HAVING DOMED CENTER AND FLAT CENTRAL BOTTOM RING AND METHOD OF MAKING THEREOF

This application is a continuation-in-part of application Ser. No. 11/799,208, filed Apr. 30, 2007 now U.S. Pat. No. 7,947,352, and Ser. No. 12/001,924, filed Dec. 12, 2007 now U.S. Pat. No. 8,372,500.

BACKGROUND OF THE INVENTION

1. Field of the Invention

This invention relates generally to digital recording media and, more specifically, to a Flexible VCD Having Domed Center and Flat Central Bottom Ring and Method of Making Thereof.

2. Description of Related Art

Portable storage of digital electronic data is a rapidly-developing field. The focus of the present invention is that of laser-readable (and writable) discs. Laser-readable disc types are generally Compact Discs (including CDs-prerecorded, CDRs-recordable, and CDRWs-rewritable) and Digital Video Discs (including DVDs-prerecorded, DVRs-recordable, and DVRWs-rewritable). Each of these disc designs and formats have similar basic structural configurations, as depicted in FIG. 1.

FIG. 1 is a perspective view of a conventional laser-readable disc 10. The conventional disc 10 has a plastic substrate 12 defined by a central spindle hole 14 formed therethrough. Standard CDs and DVDs have a substrate 12 defined by a 120 millimeter diameter 16 and a thickness 18 of 1.2 millimeters. While the standard disc 10 has a perimeter edge 20 that is circular, other shapes (and sizes) are readily available—of particular note is the business-card-sized disc. Data is stored on the disc via a laser readable (and optionally writable and rewritable) surface depicted here as the data storage area 21. The basics of the laser reading/writing technology will be discussed in connection with FIG. 2.

FIGS. 2A and 2B are partial cutaway side views of conventional compact and digital video discs, respectively. The conventional compact disc (CD, CDR, CDRW) 10A is defined by a substrate 12 having a thickness 18 that is 1.2 millimeters both at the perimeter edge 20 and at the central spindle hole 14. The substrate 12 is further defined by a top (recording) surface 22 and a bottom (read) surface 24. This is to say that the disc player/recorder's laser projects upwardly towards the disc substrate 12 from the bottom (at least in the depicted orientation). The laser light actually passes through the substrate 12 until it is reflected back by the bottom side of the top (recording) surface 22. The digital data is stored as a sort of texture on the top (recording) surface 22; the texture effects the way in which the laser light is reflected back down to the laser reader, which is interpreted as data in a standardized format. Of course other important elements are a part of CDs and DVDs, such as the type of reflective coating applied to the recording surface (which can determine whether the disc is rewritable or recordable), as well as any decorative films or colorations applied above that.

FIG. 2A depicts the structure of a conventional digital video disc DVD, DVR, DVRW). The conventional DVD is actually comprises of two thin discs bonded together. While the overall disc thickness 18 is 1.2 millimeters at the perimeter edge 20 and the spindle hole 14, this overall substrate thickness is actually made up of a top substrate element 12A bonded atop the bottom substrate element 12B. The bottom substrate element 12B is actually the data-storing portion of the disc 10B. The top (recording) surface 22 is actually the top surface of the bottom substrate element 12B. Of course, the bottom (read) surface 24 is the bottom surface of the bottom substrate element 12B. The bottom substrate element 12B has a disc thickness of 0.6 millimeters, which means that the depth of the disc as read by the laser is only 0.6 millimeters.

The top substrate element 12A, which is also 0.6 millimeters thick provides really no functional benefit to the disc 10B beyond making it stiffer than the bottom substrate 12B alone would be, and further providing the additional thickness necessary to provide an overall disc thickness 18 of 1.2 millimeters.

A critical aspect of the configuration of CDs and DVDs is the thickness of the disc substrate directly adjacent to the spindle hole 14. When a disc is loaded for playing/recording in a disc player, the player will actually clamp down on the disc over the spindle hole 14. The player will then conclude by that the disc top surface 22 or 26 is at the same level as the top of the disc clamp. The laser will then be energized to determine the disc depth/thickness to the top (recording) surface 22. In the case of a CD 10A, the player/recorder will detect a depth of 1.2 millimeters, while in the case of a DVD 10B, the player/recorded will detect a depth of 0.6 millimeters. This detected depth is a way for the player/recorder to confirm whether the disc is a CD or a DVD. As such, conventional CD and DVD players and recorders rely upon the thickness of the disc under the disc clamp (in the player) to determine whether a CD or a DVD is being read. If there is a non-standard depth, or a non-standard disc thickness 18 adjacent to the spindle hole 14, the error will prevent the disc from being reliably read on all player/recorders.

As discussed above, the extra substrate element included with a conventional DVD is not involved in the actual data recording and reading (at least beyond giving the player its initial focus check). There are, however, limitations to the useless of the DVD introduced because of this extra thickness. First, if the DVD was thinner (i.e. 0.6 millimeters), it would be flexible. A flexible DVD could be very popular in the context of mass mail advertising (such as in magazines); now the discs have to remain flat. Furthermore, the second substrate is simply wasted material; its elimination would be cost effective and more environmentally conscious. Finally, less material will reduce mold processing time as well as eliminating a production step involving the bonding of the top substrate element 12A to the bottom substrate element 12B.

SUMMARY OF THE INVENTION

In light of the aforementioned problems associated with the prior systems and methods, it is an object of the present invention to provide a Flexible VCD Having Domed Center and Flat Central Bottom Ring and Method of Making Thereof. The preferred disc will have a flat data storage section of its substrate that is less than 0.7 millimeters thick, while the region of the disc should be defined by a dome structure adjacent to the spindle aperture that is of standard digital disc thickness. The disc should be thin enough to allow its substrate to be flexible. The dome structure should be shaped to provide the widest compatibility with player/recorders, as well as with disc printing systems. Disc versions should be available that provide conical dome structures, as well as slivered dome structures of both conical and rectangular cross-section, and a combined design having a plurality of raised protrusions on the top surface of the disc, and a flat central ring protruding from the bottom surface of the disc. The method for manufacturing the discs should be limited to replacing the conventional stamper holder with a stamper holding having a non-flat face.

BRIEF DESCRIPTION OF THE DRAWINGS

The objects and features of the present invention, which are believed to be novel, are set forth with particularity in the appended claims. The present intention, both as to its organization and manner of operation, together with further objects and advantages, may best be understood by reference to the following description taken in connection with the accompanying drawings, of which:

FIGS. 10A-10C are top and partial cutaway side views, respectively, of a first alternative embodiment of the flexible digital video disc of the present invention;

FIGS. 11A and 11B are a top and a partial cutaway side view, respectively, of a second alternative embodiment of the flexible digital video disc of the present invention;

FIGS. 12A-12C are top and partial cutaway side views, respectively, of a third alternative embodiment of the flexible digital video disc of the present invention;

FIGS. 14A-14C are top, bottom and partial cutaway side views, respectively, of a fifth alternative embodiment of the flexible digital video disc of the present invention.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Flexible VCD Having Domed Center and Flat Central Bottom Ring and Method of Making Thereof.

Figure 1:
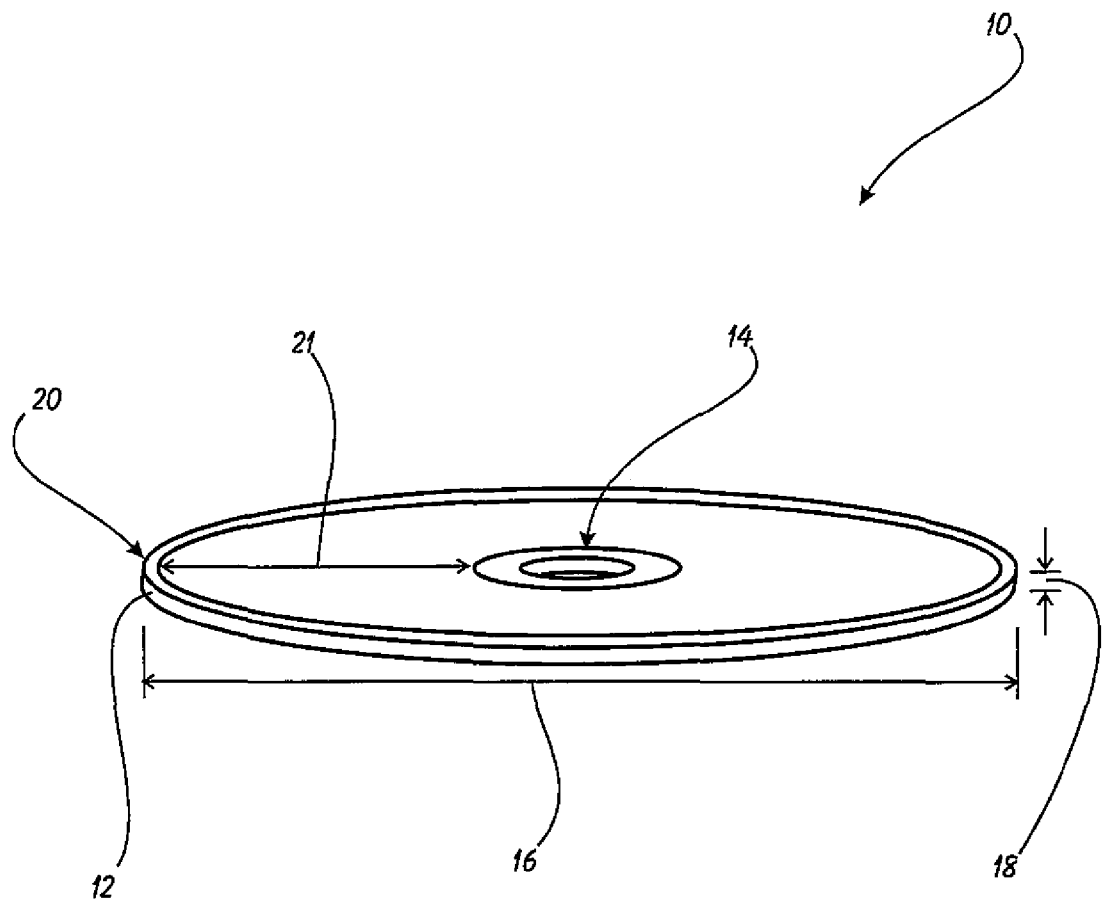
FIG. 1 is a perspective view of a conventional laser-readable disc.
Figure 2A:
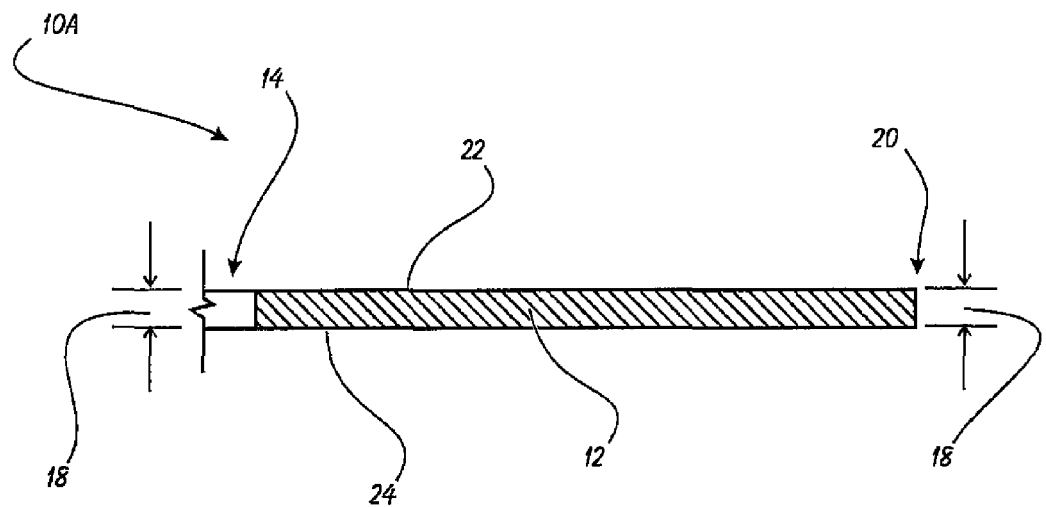
FIGS. 2A and 2B are partial cutaway side views of conventional compact and digital video discs, respectively.
Figure 2B:
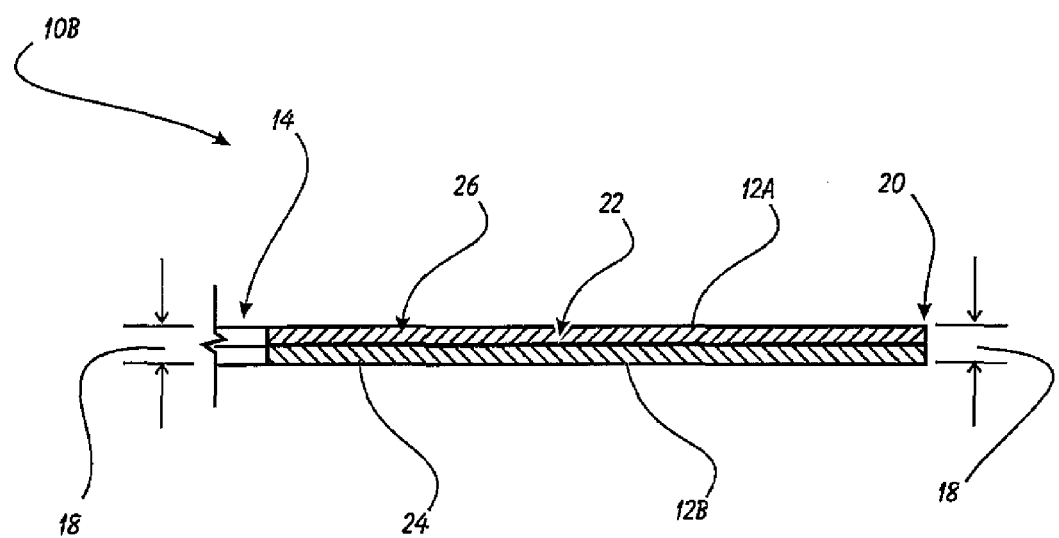
Figure 3:
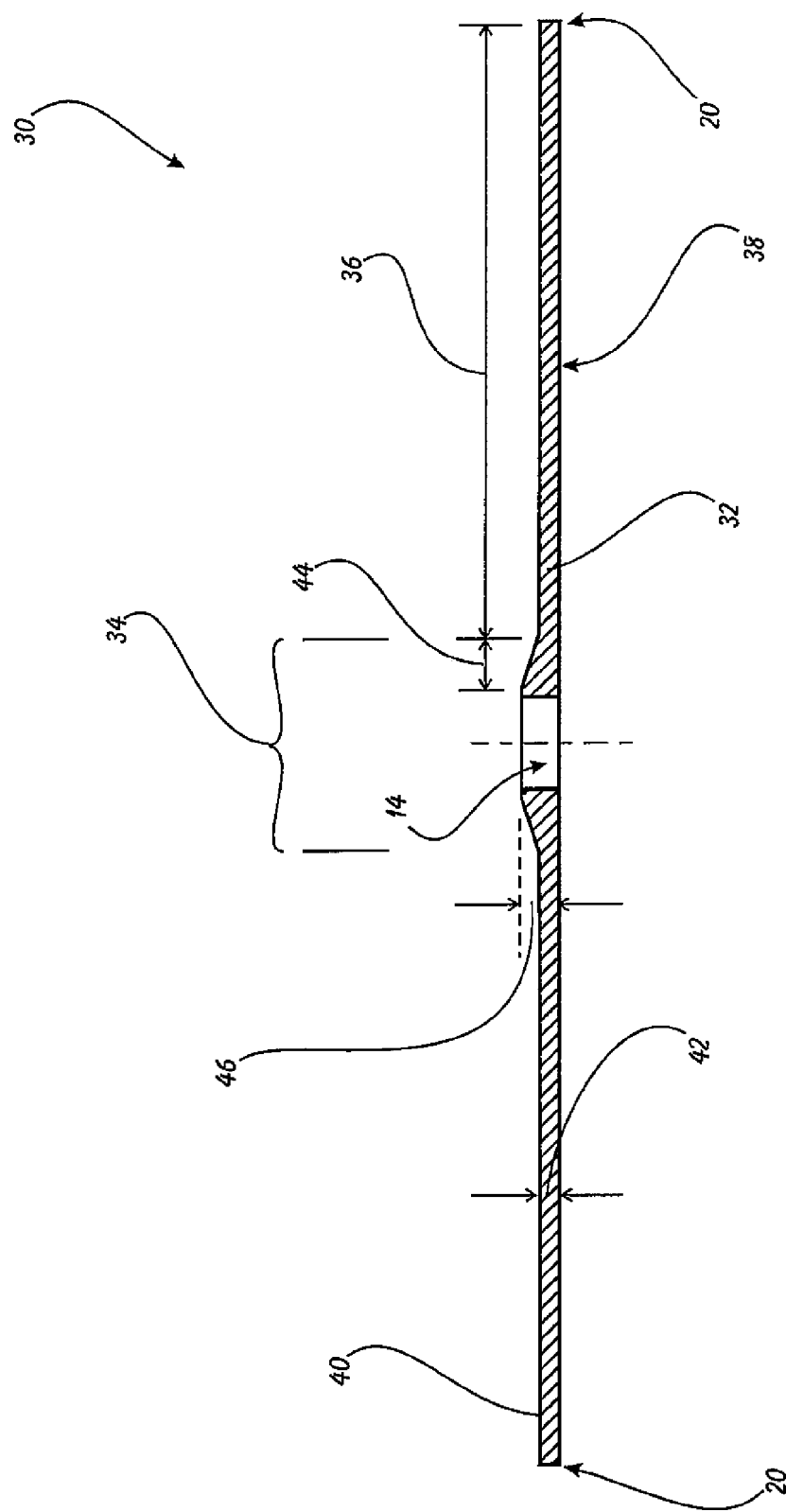
FIG. 3 is a cutaway side view of a preferred embodiment of the flexible digital video disc of the present invention.

The present invention can best be understood by initial consideration of FIG. 3. FIG. 3 is a cutaway side view of a preferred embodiment of the flexible digital video disc 30 of the present invention. Unlike the conventional digital video disc discussed above in connection with FIG. 2B, this disc 30 is not of a uniform thickness across its cross-sectional profile. Instead, the disc 30 has a thin outer portion 36, and a thick center portion 34. Directly adjacent to the spindle hole, the disc thickness 46 is 1.2 millimeters, while the thin outer portion 36 of the substrate 32 is only 0.6 millimeters.

The "domed" center portion 34 of this disc 30 exhibits a specific profile in its cross section. The thickness of the substrate 32 first begins to gradually thicken beginning at 45 millimeters from the perimeter edge 20 of the convention circular disc. This is precisely 55 millimeters from the center of the disc (a non-circular disc would use this center-centric dimension). The purpose of this thickened center portion 34 is to "fool" the digital disc player/recorder into believing that the entire disc 30 is of standard thickness (i.e. 1.2 millimeters). The profile of this embodiment of the domed center portion 34 is to slope upwardly to form a flat-topped cone, with the slope raising 0.6 millimeters (rise) over the span of 7.0 millimeters (run). While other profiles may be suitable, as will be discussed below in connection with FIGS. 10-12, this particular profile has been demonstrated to give substantial benefits.

The thin outer portion 36 makes the disc 30 deformable, or "flexible," which enables the disc 30 to be used in a wider variety of applications. Specifically, this flexible digital video disc 30 can be safely enclosed within a magazine without fear that curling the magazine will break the disc 30. Now tuning to FIGS. 4A and 4B, we can see the entire form of the disc 30.

Figure 4A:
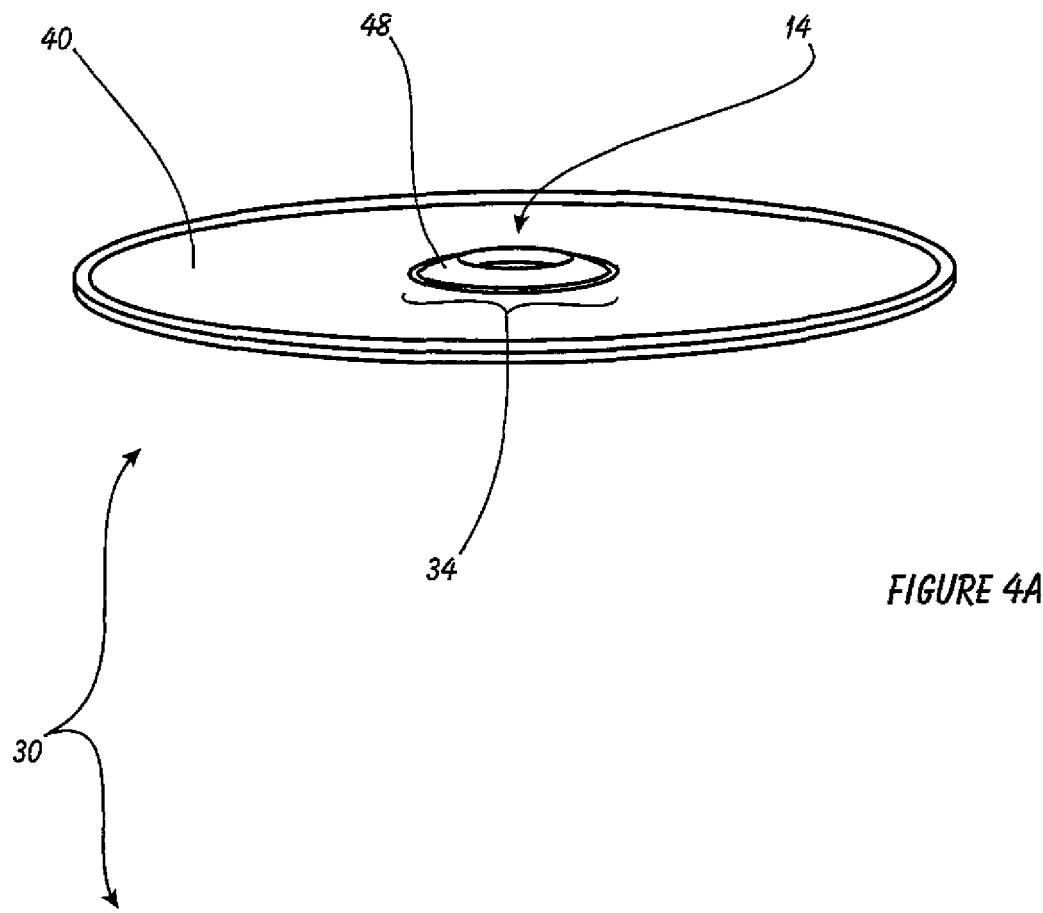
FIGS. 4A and 4B are top and bottom perspective views of the disc of FIG. 3.
Figure 4B:
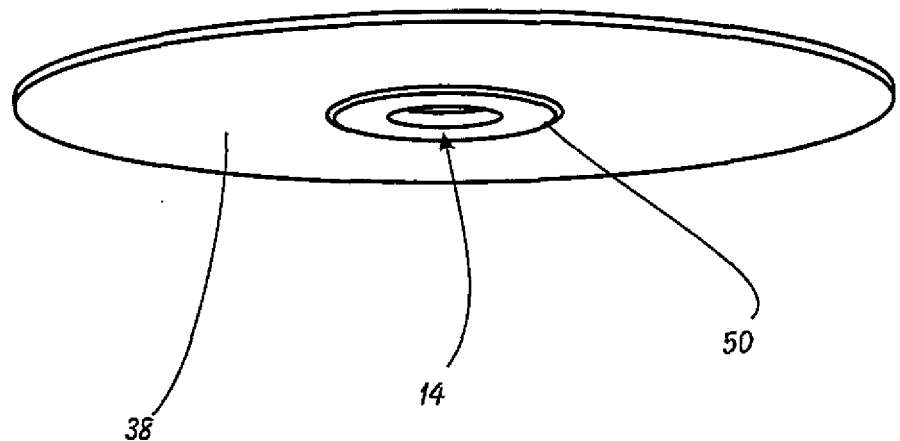

FIGS. 4A and 4B are top and bottom perspective views of the disc 30 of FIG. 3. As discussed above, the center dome 34 in this disc version has a flat-topped conical shape defined by a sloped top surface 48 protruding upwardly from the top (recording) surface 40. The shape of his center dome 34 has at least two significant benefits over any other versions of flexible digital discs—it has demonstrated universal compatibility with player/recorders, and it is compatible with standard disc printing processes (i.e. when indicia is added to the top surface 40 of the disc 30, such as for labeling).

Not all player/recorders clamp digital discs at the same location or in the same manner. Some player/recorders clamp directly adjacent to the spindle hole 14, while others tend to have a wider clamping ring area. Furthermore, some clamps are not continuous around the circumference of the spindle hole 14, but instead have a series of ridges or partial rings clamping down on the top of the disc. If a particular player/recorder does not "register" the correct 1.2 millimeter thickness of the disc, it will not play. The sloped top surface 48 of this embodiment of the disc 30 has proven to achieve universal compatibility with any and all player/recorders.

Regarding the printing of indicia atop the top surface 40 of the disc 30, the standard printing process involves the use of software to lay out the art work for the top of the disc, which then controls the printing or ink stamping of the indicia onto each disc. The software is designed to work with a standard, flat, smooth top surface 40. Any sharp protrusions from the top surface 40 tend to interfere either with the layout of the artwork, or with the actual functioning of the print head or stamp. The sloped top surface 48 of this embodiment of the disc 30, due to its gradual upslope and absence of sharp edges, has proven to be fully compatible with standard software and printing or stamping systems. Since the print function is conducted in mass production on standard equipment, it is critical that no special operational or equipment modifications are necessary.

As depicted in FIG. 4B, as with a standard CD or DVD, the disc 30 also has a centering ring 50 protruding downwardly from the bottom (read) surface 38 of the disc 30. The centering ring 50 engages a cooperatively located groove in the platter of the player/recorder in order to assist in centering the disc 30 within the player/recorder. Now that we have discussed the structural aspects of the present disc 30 embodiment, we can turn to the novel production process by first discussing the prior art method of disc production.

Figure 5:
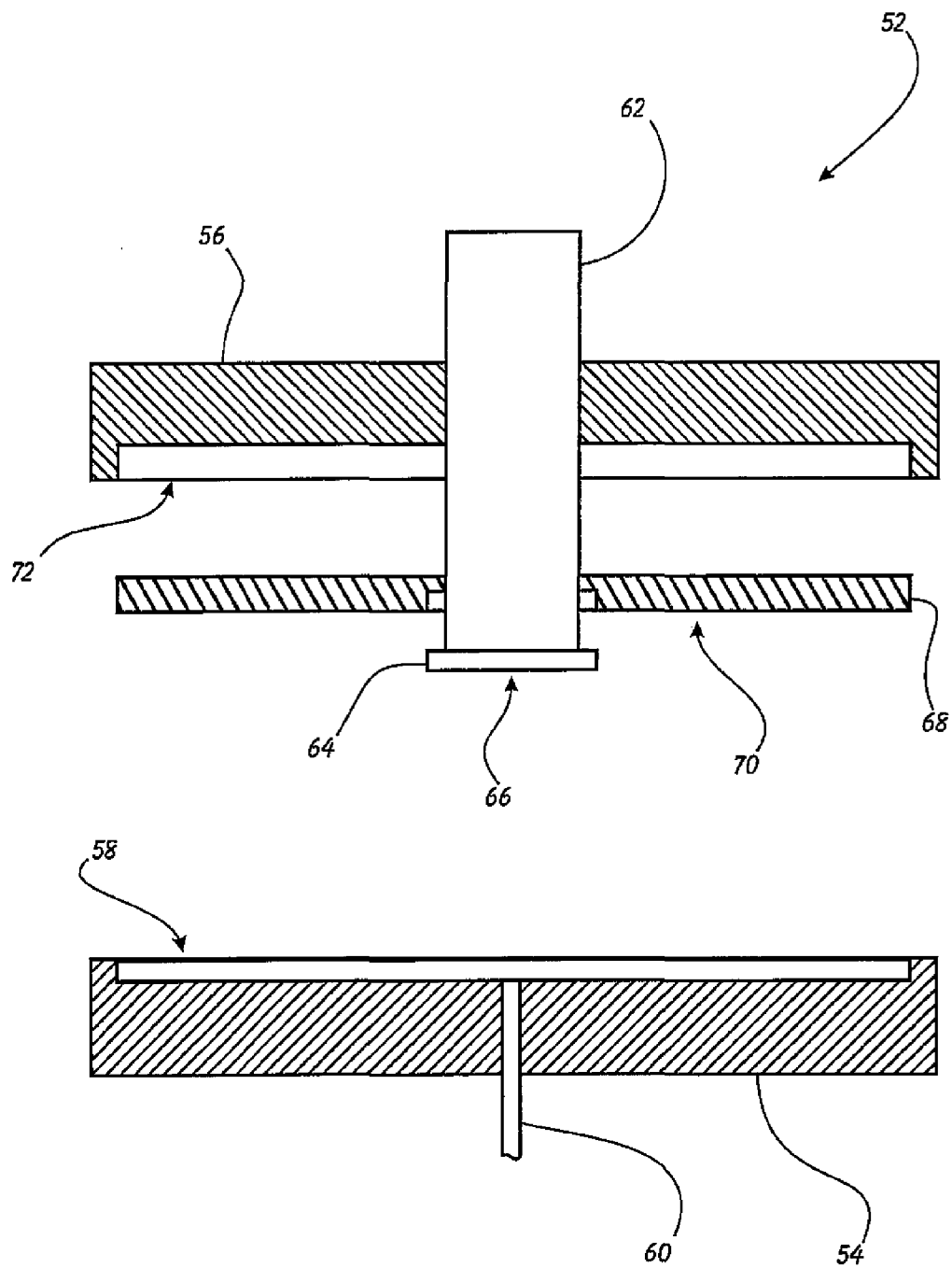
FIG. 5 is an exploded cutaway side view of the mold assembly for a conventional digital video disc.

FIG. 5 is an exploded cutaway side view of the mold assembly 52 for a conventional digital video disc. The manufacturing process for a conventional digital disc is typically by injection molding. A pelletized plastic material is injected into a mold form; once full, the mold is heated to a predetermined temperature which causes the pellets or beads to expand and/or coagulate into a solid plastic piece. The molded disc is then cooled and removed from the mold. The top (recording) surface of the disc is molded either with the data (for laser reading) formed into it, or if a recordable or rewritable disc, the top (recording) surface is prepared with no data recorded therein. Later processing steps include the application of specialized metalized layers atop the plastic top surface of the disc, which enables the laser to read and/or record the data on the top (recording) surface of the disc.

The conventional mold assembly 52 is comprised of a stationary mold half 54 and a moving mold half 56. In the depicted version, the bottom half is stationary and the top half is moving (or movable), however a variety of equipment types are available (e.g. the moving and stationary halves could be the reverse from that depicted here), and the depicted arrangement is only one example.

The stationary mold half 54 has a recessed section 58, which generally is the mold form for the bottom (read) surface of the disc. Although not depicted here, there would normally be a groove in the bottom surface of the recessed portion 58 to create the centering ring (see FIG. 4B) in the bottom surface of the disc. The plastic beads are injected into the mold 52 via the plastic injection port 60, shown here generally centered in the stationary mold half 54.

The moving mold half 56 also has a recessed section 72, however this section 72 does not create a molded surface of the disc, but rather is a "pocket" for receiving a stamper 68. The stamper 68 is the form to create the top surface of the disc. The molding equipment must be standardized to form the perimeter and bottom surface disc shape, but the top surface of the disc must be customizable so that the same molding equipment can produce custom discs (e.g. prerecorded, recordable or rewritable). To change a disc's data or its recordability, only the top surface of the disc will be different from other discs. As such, only the stamper 68 need be changed to set up the equipment to ran a different type (or having different prerecorded data thereon).

The stamper 68 has a patterned face 70 that is a "negative" of the prerecorded data from the data master recording. The stamper 68 is held within the recessed section 72 of the moving mold half 56 by the stamper holder 62. The stamper holder 62 has a head 64 that actually holds the stamper 68 within the recessed portion 72. The head 64 is defined by a face 66 on its bottom side. As should be apparent, the face 66 forms a portion of the disc at its very center (that portion of the disc inside of the data recording zone), and generally is simply a flat smooth surface (or has a hole formed within it to allow a punch to form the spindle hole in the disc). Just prior to plastic injection, the mold assembly 52 will appear as shown in FIG. 6.

Figure 6:
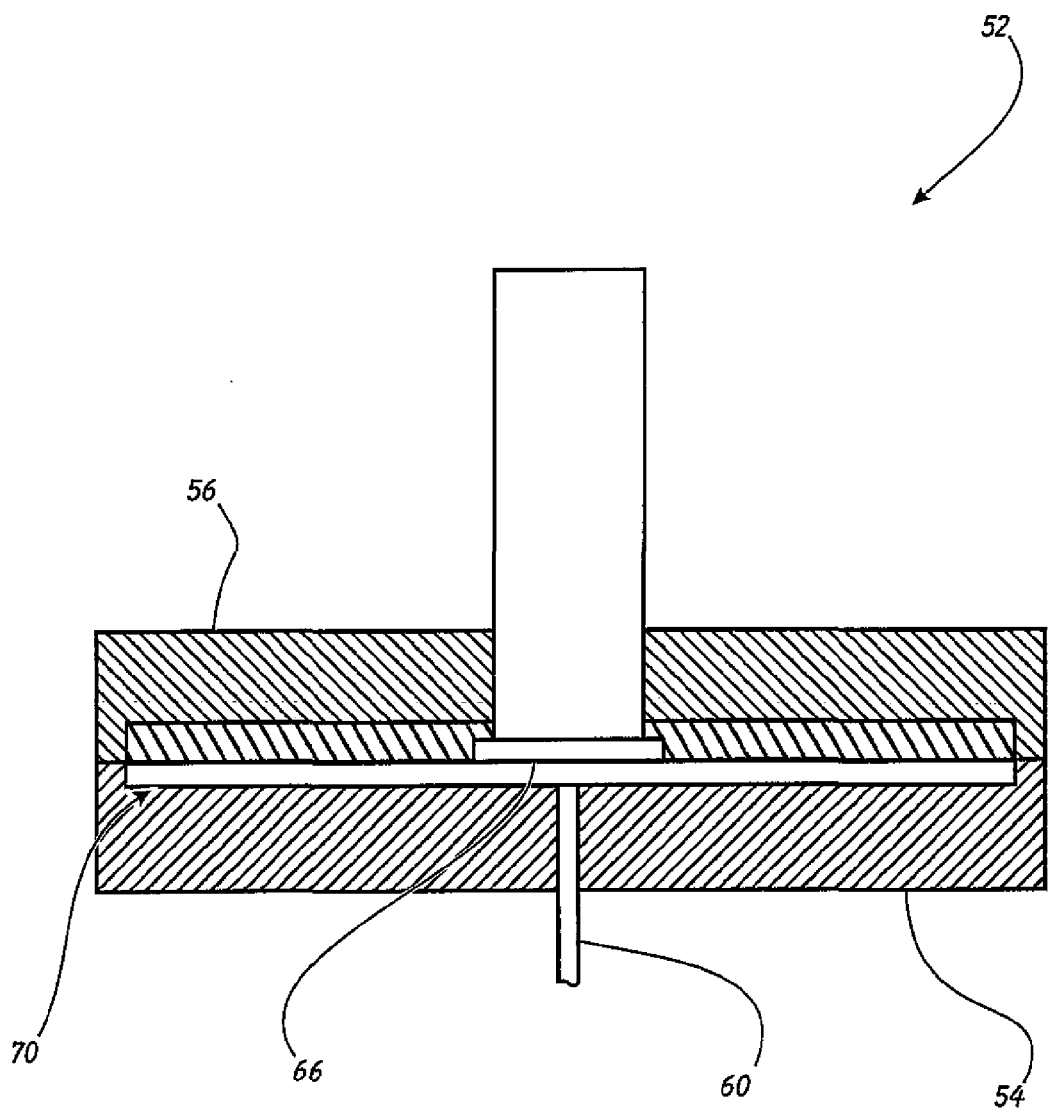
FIG. 6 is a cutaway side view of the mold assembly of FIG. 5 in its closed position.

FIG. 6 is a cutaway side view of the mold assembly 52 of FIG. 5 in its closed position. Here, the moving mold half 56 is pressed against the stationary mold half 54 to form the disc mold 72. The disc mold 72 is the void between the stamper patterned face 70 and stamper holder face 66 (on the top here) and the recessed portion formed within the stationary mold half 54. Once closed, plastic beads are injected into the mold 72 via the plastic injection port 60. The disc will be shaped as the negative of the disc mold 72. Now turning to FIG. 7, we can examine how the disc of the present invention is manufactured using standard equipment.

Figure 7:
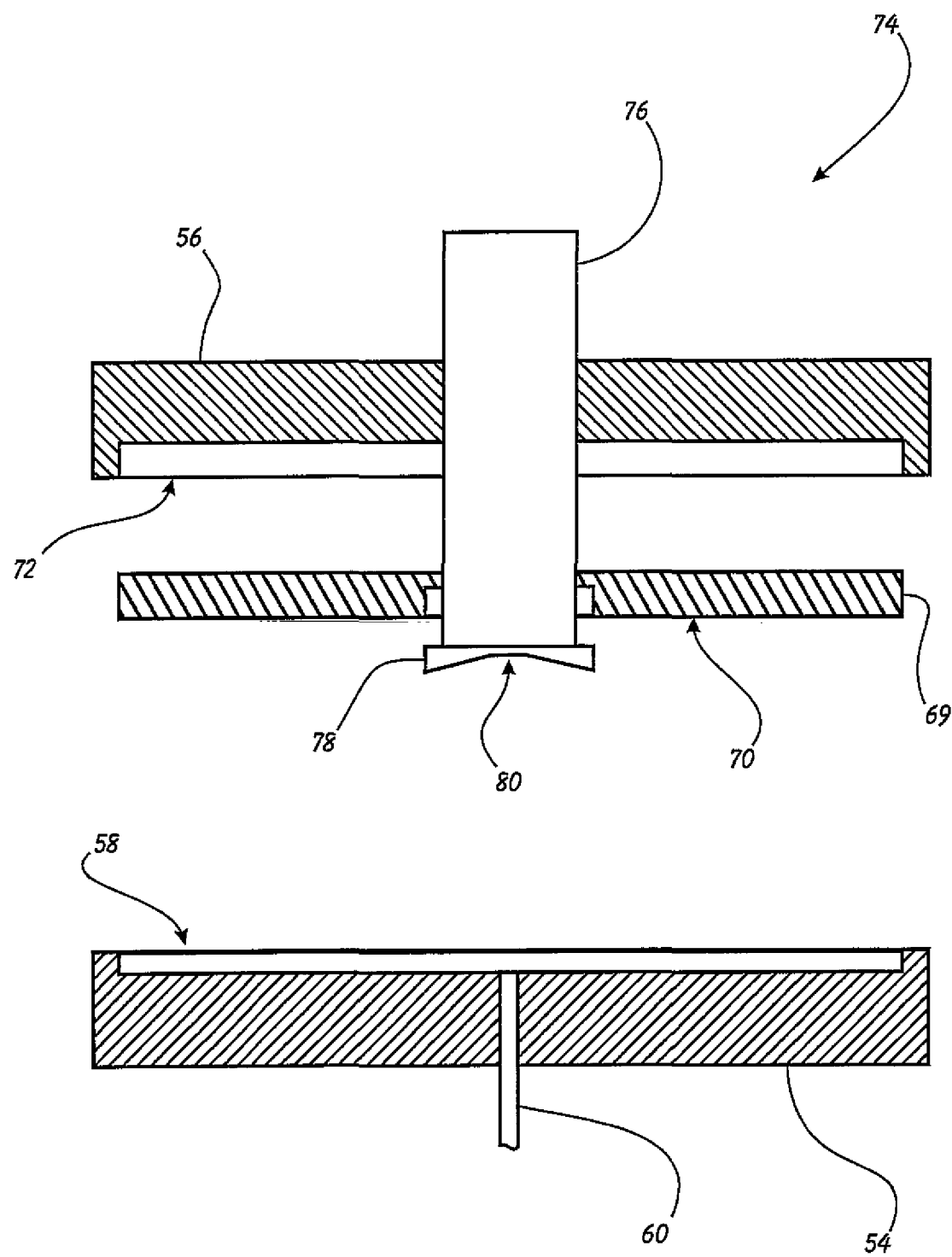
FIG. 7 is an exploded cutaway side view of the mold assembly for the disc of FIG. 3.

FIG. 7 is an exploded cutaway side view of the mold assembly 74 for the disc of FIG. 3. Virtually all of the components of the mold assembly 74 are unchanged from the conventional assembly of FIGS. 5 and 6—the stationary mold half 54, the moving mold half 56 (and their recessed sections 72 and 58), and even the stamper 69 are unmodified from the standard versions discussed above. The stamper 69 is shown here as being thicker than that shown in FIGS. 5 and 6 because the disc being formed in this mold assembly 74 is thinner than a standard CD. In fact it is the same thickness as the bottom substrate element (see FIG. 2B) of a DVD, which is the standard thickness for that type of disc.

Figure 8:
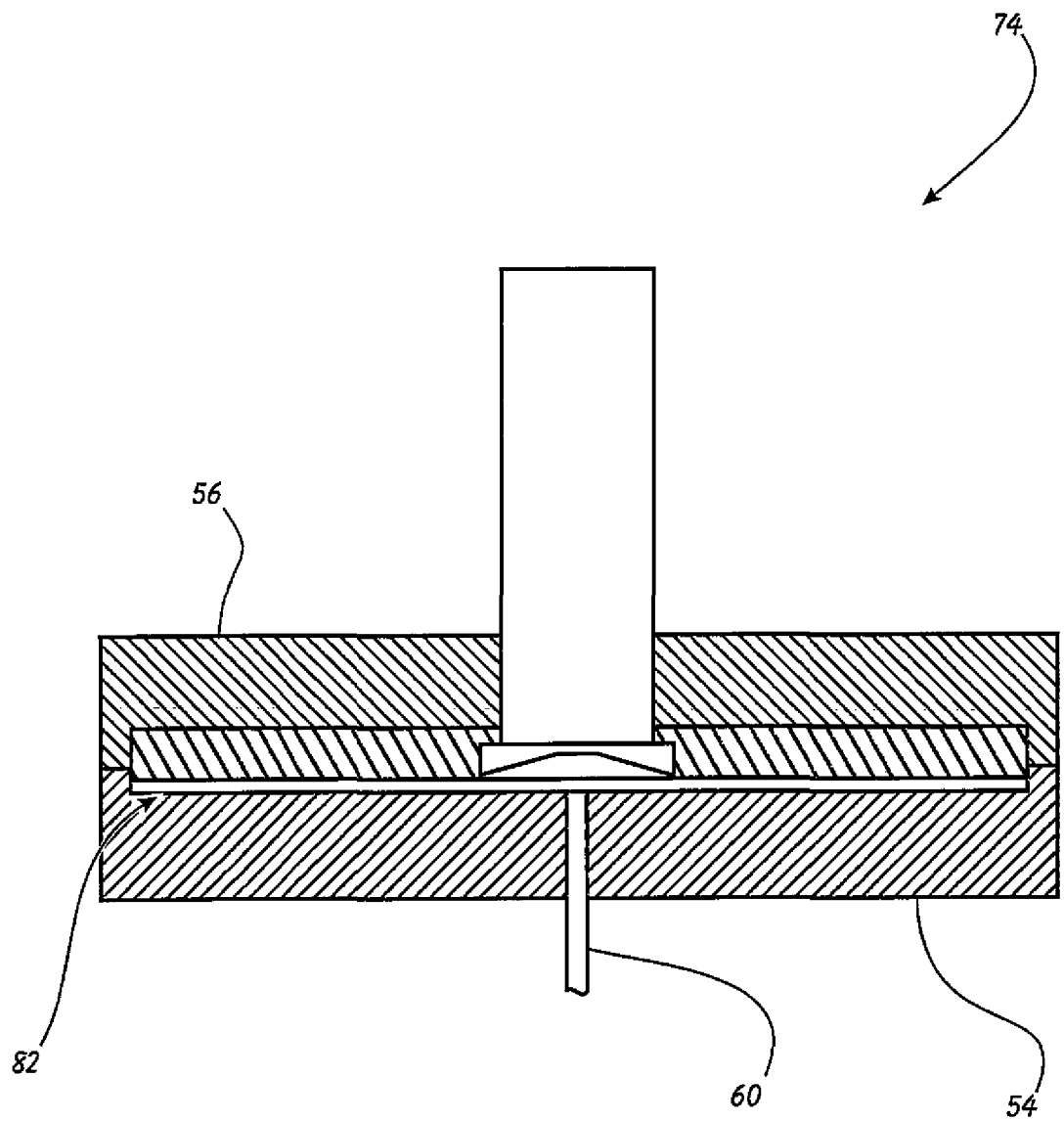
FIG. 8 is a cutaway side view of the mold assembly of FIG. 7 in its closed position.
Figure 9:
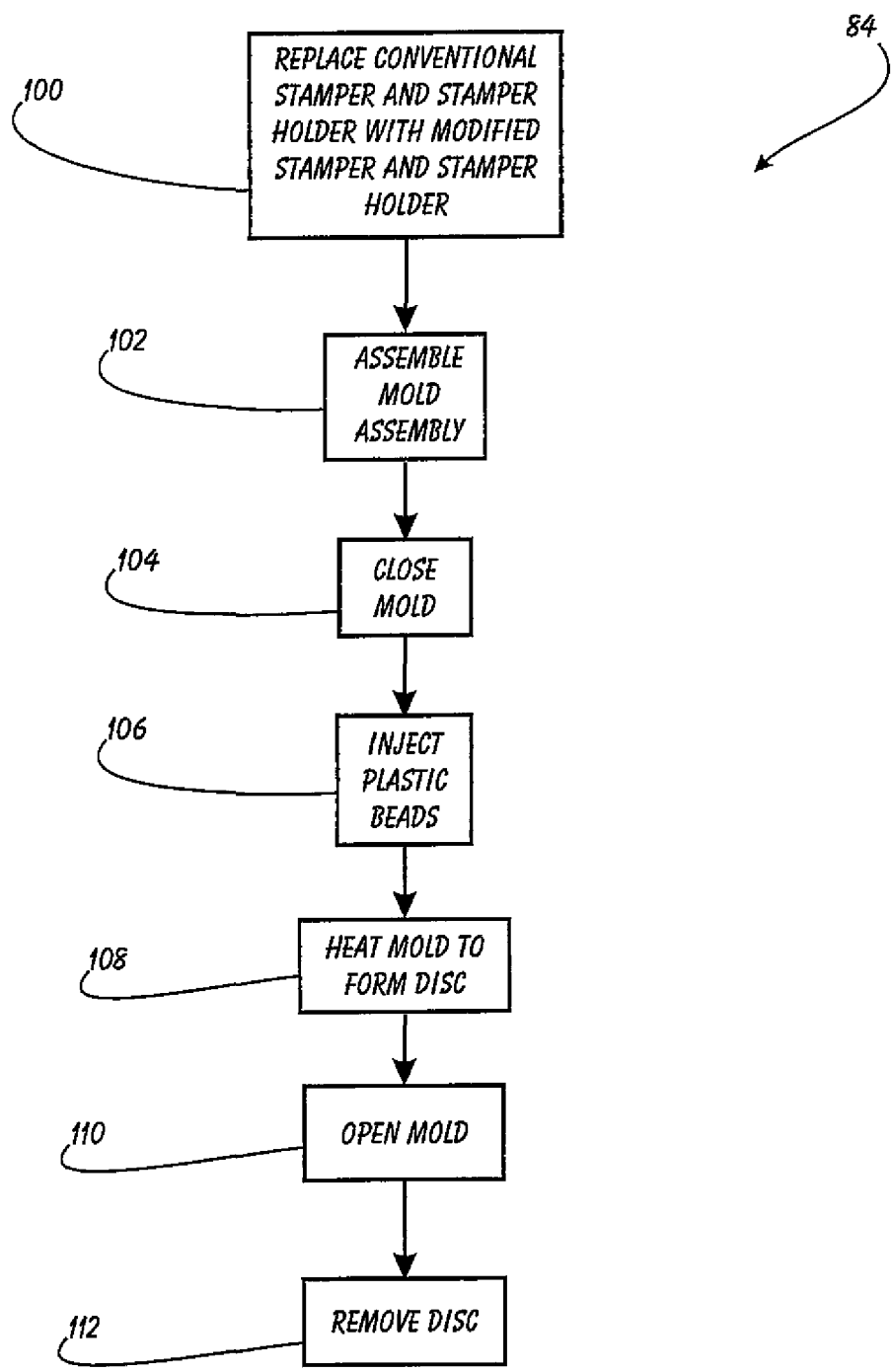
FIG. 9 is a block diagram of the preferred method of making the flexible digital video disc of FIG. 3.

What is new here is the modified stamper holder 76. The modified stamper holder 76 operates and is formed virtually identical to a conventional stamper holder, with one exception—the head 78 and face 80. The modified stamper holder 76 has a domed face 80 to create the raised center portion of the disc of FIG. 3. As shown in FIG. 8, when the mold assembly 74 is in a closed position, the disc mold 82 will have a domed section centered in the top surface of the disc, with the disc itself being one-half the thickness of the CD-type disc shown in FIGS. 5 and 6. Turning to FIG. 9, we will see that the manufacturing method, while unique, is fully compatible with conventional manufacturing equipment.

FIG. 9 is a block diagram of the preferred method 84 of making the flexible digital video disc of FIG. 3. First, the conventional stamper 68 (see FIG. 5) is replaced with a modified stamper 69 (see FIG. 7) if necessary, and the conventional stamper holder 62 (see FIG. 5) is replaced with a modified stamper holder 76 (see FIG. 7) 100. Next, the mold assembly 74 (see FIG. 7) is assembled 102, and the mold assembly 74 (see FIG. 8) is closed 104. Plastic beads are then injected 106 and the mold is heated 108 in order to form the disc 30 (see FIG. 3). The mold is later opened 110 (sometimes after cooling and other processing), and the disc is removed 112.

The only step in the method 84 that really differs from the conventional disc manufacturing method is the first one identified (step 100)—the exchange of the conventional stamper and stamper holder with modified stamper and stamper holder. No other modification to the conventional mold assembly is necessary.

Having fully discussed first embodiments of the present invention, we will examine several alternate embodiments of the disc of the present invention, commencing with the disc shown in FIGS. 10A-10C.

FIGS. 10A-10C are top and partial cutaway side views, respectively, of a first alternative embodiment 30A of the flexible digital video disc of the present invention. The disc 30A is formed in the same manner as discussed above in connection with FIG. 9, however the stamper holder face is formed so that a plurality of "dome slivers" 34A, rather than a solid "dome" is formed adjacent to the spindle hole 14. The outer thin portion 36A will then actually reach the spindle hole 14 in alternating arcs around its circumference. There may be three or more slivers 34A in spaced relation around the hole 14.

As shown in FIG. 10B, each dome sliver 34A may be sloped in its cross-sectional profile, just as with the first embodiment of the disc (FIG. 3). Alternatively, as shown in FIG. 10C, the slivers 34A may have a sharp edge, rather Man a sloped top surface. In either case, the method of FIG. 9 will be suitable for forming the profile.

FIGS. 11A and 11B depict yet another preferred version 30B of the disc of the present invention. Rather than a sloped dome, this version has a dome ring 34B that is has squared edges and a thickness 35 of approximately 3 or 4 millimeters. This thin dome ring 34B has been determined to be functional with many player/recorders, and tends to use less material than the first disc embodiment.

FIGS. 12A-12C depict another version 30C of the disc of the present invention. FIGS. 12A-12C are top and partial cutaway side views, respectively, of this third alternative embodiment. This disc version 30C is essentially a combination of the two versions shown in FIGS. 10A-10C and 11A-11B, that is, there is a combination ring/sliver dome 34C adjacent to the spindle hole 14. The cross-section may be as shown in FIG. 12B, with a central ring portion 34B of 3-4 millimeters, from which sloped dome slivers 34A extend radially. Alternatively, as shown in FIG. 12C, the dome slivers 34C may have squared edges. While more complex than the previous versions, this type will tend to be fully compatible with all player/recorders, while still providing modest material savings over the sloped dome version of FIG. 3

Figure 13C:
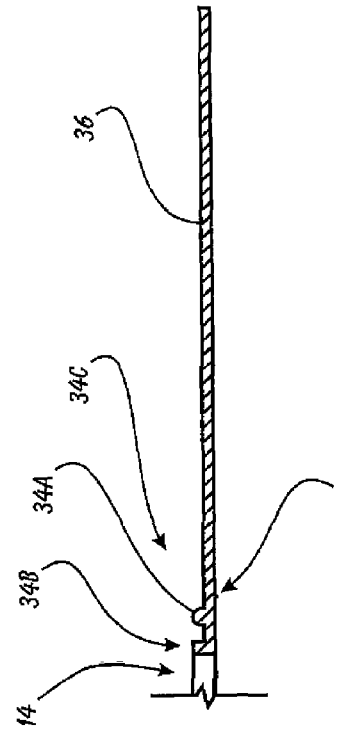
FIGS. 13A-13C are top and partial cutaway side views, respectively, of a fourth alternative embodiment of the flexible digital video disc of the present invention.
Figure 13B:
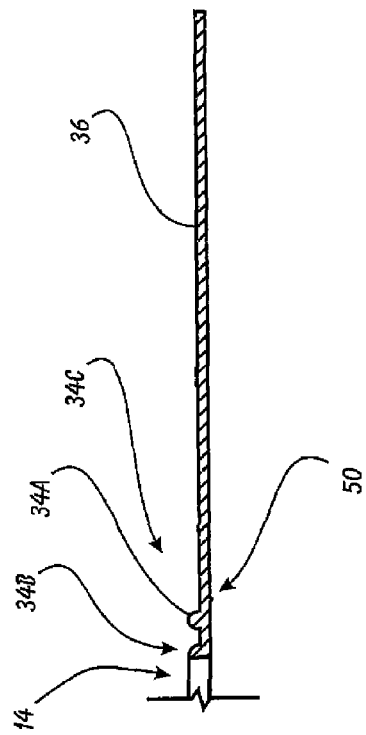
Figure 13A:
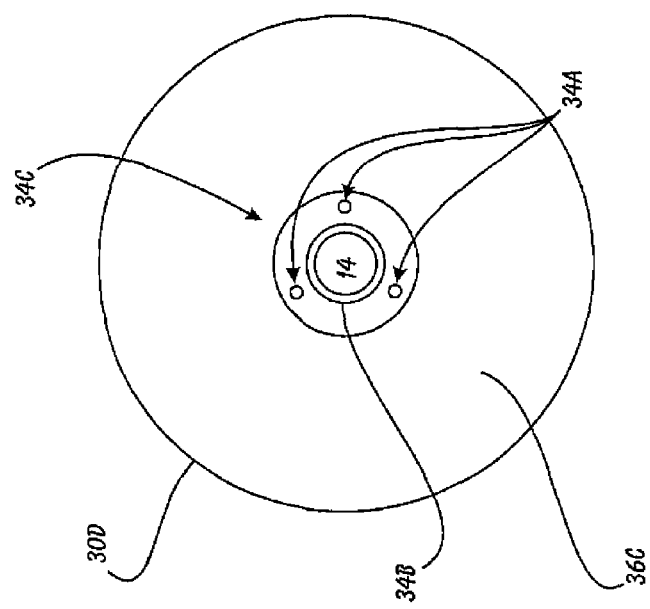

Finally, FIGS. 13A-13C are top and partial cutaway side views, respectively, of a fourth alternative embodiment 30D of the flexible digital video disc of the present invention. The ring/sliver dome 34C adjacent to the spindle hole 14 comprises a central ring portion 34B surrounded by a plurality of dimple-shaped dome slivers 34A in equal spaced relation, as shown. Here, there are three dimple-shaped dome slivers 34A, positioned at 120 degree arc increments around the spindle hole 14.

As discussed above, the diameter of the spindle hole 14 is conventionally 15 millimeters. The central ring portion 34B preferably extends from a 15 (fifteen) millimeter diameter at its inner edge to 19 (nineteen) or 20 (twenty) millimeters in diameter at its outer edge. The height of the central ring portion 34B is preferably 0.6 millimeters (i.e. above the top surface of the disc 30D).

Each dimple-shaped dome sliver 34A is circular in shape when viewed from atop the disc 30D, with its center located at approximately the 32 (thirty-two) or 33 (thirty-three) diameter arcs. As mentioned earlier, where there are three dimple-shaped dome slivers 34A, they will be equally spaced to surround the spindle hole 14 at a point that is separated from the adjacent dimple-shaped dome slivers 34A by 120 degrees. In the depicted version, each dimple-shaped dome sliver 34A has its own diameter of approximately 0.2 millimeters in diameter.

As shown in FIG. 13B, the outer edge of the central ring portion 34B could have a sloped or curved edges. Another version is shown in FIG. 13C, wherein the outer edge of the central ring portion 34B is a sharp or square edge. Now turning to FIGS. 14 and 15, we can examine another version of the disc of the present invention and the equipment used to manufacture it.

FIGS. 14A-14C are top, bottom and partial cutaway side views, respectively, of a fifth alternative embodiment 30E of the flexible digital video disc of the present invention. Both the top and bottom surfaces of the substrate have raised features, such that the total thickness of the central portion is approximately 1.2 millimeters.

The top surface has a plurality of raised dimple-shaped dome elements 34A in relative spaced relation; these elements make up the fifth embodiment of the dome 34E. Each element 34A has a height of either approximately 0.15 millimeters, or 0.30 millimeters (that is their height is either 0.15 or 0.3 millimeters high relative to the flat height of the outer thin portion 36C.

The bottom surface has two rings protruding downwardly from it. As in prior versions, there is an outer centering (or stacking) ring 50, having a radius of approximately 35 millimeters and a width of approximately 1 millimeters. There is also a flat central ring 51 nested within the centering ring 50. The flat central ring 51 is approximately 3 millimeters in height (relative to the outer thin portion 36C), and has a width extending from the central aperture 14 to a radius of 32 millimeters.

The combination of the dome 34E and the central ring 51 allows thin, flexible outer thin portion (that is bendable), but can be used to emulate either a compact disc or a digital video disc. Also, 3 inch miniature discs and business card digital discs can be made having these central features (34E, 51 and 50), to provide robust data record/play capabilities.

Figure 15:
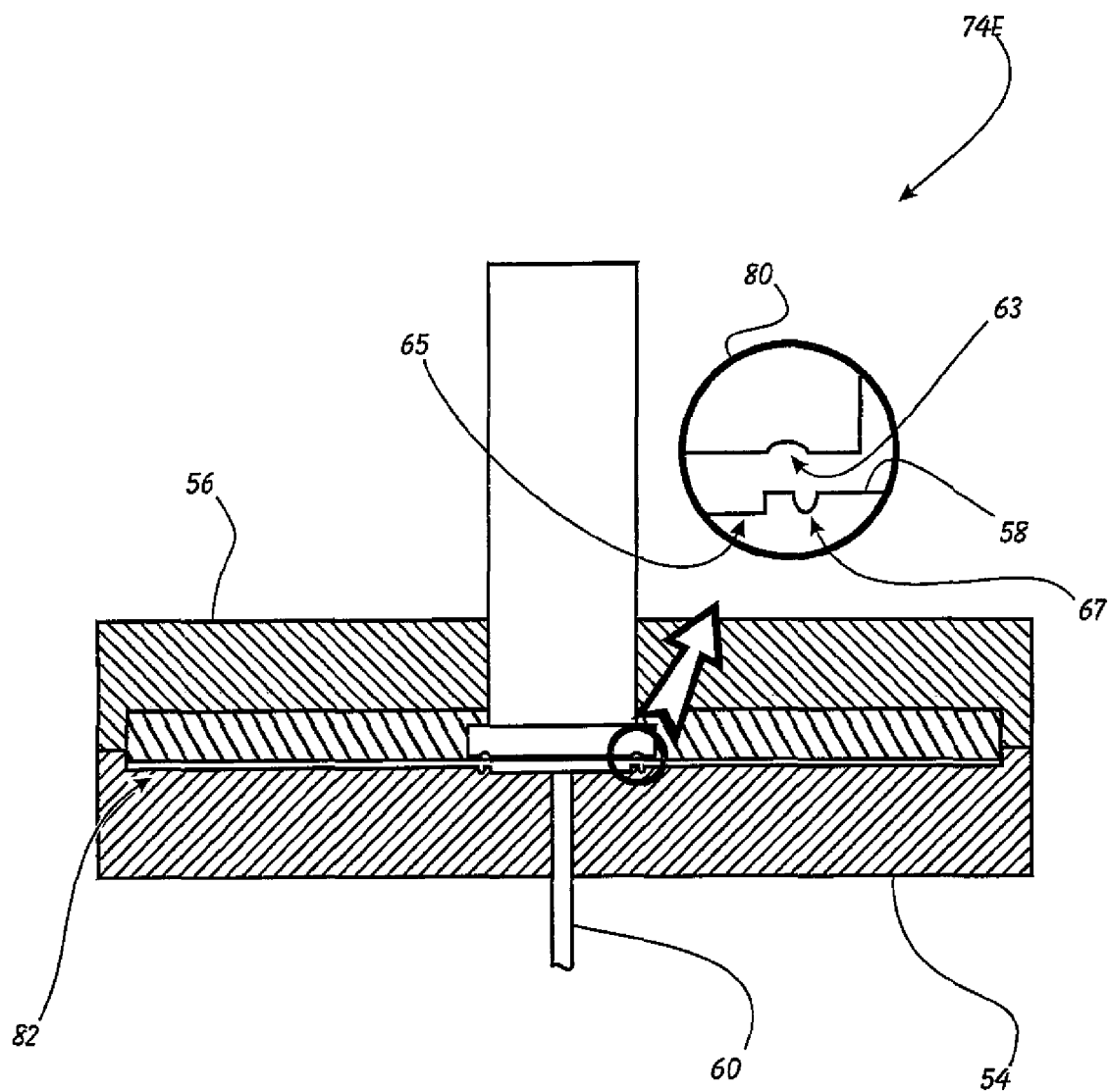
FIG. 15 is a cutaway side view of the mold assembly for the disc of FIGS. 14A-14C in its closed position.

FIG. 15 is a cutaway side view of the mold assembly for the disc of FIGS. 14A-14C in its closed position. As shown in the exploded circular view to the right, the stamper face 80 has the dimple-shaped recesses 63 formed in it, while the lower stationary mold portion 58 has a central ring recess 65 and a centering (stacking) ring-shaped recess 67 formed in it.

Those skilled in the art will appreciate that various adaptations and modifications of the just-described preferred embodiment can be configured without departing from the scope and sprit of the invention. Therefore, it is to be understood that, within the scope of the appended claims, the invention may be practiced other than as specifically described herein.

What is claimed is:

1. A digital video disc, consisting essentially of:
   a single solid piece of plastic material defining a substrate having a top surface and a bottom surface, the substrate defined by:
   a central portion defined by a central spindle aperture and an outer portion, said central portion defined by a dome structure having a maximum thickness and said outer portion having a maximum thickness, said dome structure maximum thickness being greater than said outer portion maximum thickness, said dome structure comprising four or more upwardly-turned dimples extending upwardly from said top surface of said central portion, said dimples in relative spaced relation with each other and with said central spindle aperture; and
   said central portion is further defined by a central ring protruding downwardly from said bottom surface of said central portion, said central spindle aperture formed through said central ring, and said central ring extending radially to a distance of approximately 32 millimeters from an outer edge defined by said central spindle aperture, with said bottom surface of said outer portion radially beyond said central ring being devoid of any grooves formed therein.

2. The disc of claim 1, wherein each said dimple of said dome structure further defines a cross-sectional profile, said cross-sectional profile including a generally curved top surface to form a dome shape, said dimples in spaced relation to said central spindle aperture.

3. The disc of claim 2, wherein said outer portion defining a data storage area is approximately 0.6 millimeters in thickness.

4. The disc of claim 3, wherein said thickest center portion through a dimple and said central ring is approximately 1.2 millimeters in thickness.

5. The disc of claim 3, wherein said thickest center portion through said dimple and said central ring is approximately 1.05 millimeters in thickness.

6. The disc of claim 1, wherein said dome structure comprises said at least four dome dimples in spaced relation about a central spindle aperture, each said dome dimple defining a generally circular dimple-shaped protrusion.

7. The disc of claim 6, wherein each said dome dimple comprises a height of between 0.15 and 0.3 millimeters.

8. The disc of claim 7, wherein said central ring has a height extending from said bottom surface of approximately 0.3 millimeters.

9. The disc of claim 8, wherein said central ring has a substantially flat top surface.

10. The disc of claim 9, further comprising a centering ring extending downwardly from said bottom surface, encompassing and in spaced relation to said outer edge of said central ring.

11. A method for making a digital video disc, comprising:
obtaining a stamper holder defined by a head and face thereof wherein said face is defined by a shaped recessed portion, said face shaped portion further defined by three or more dome dimples in spaced relation to a central bore formed through said stamper holder;
holding a digital disc stamp within a first mold half with said stamper holder, wherein said disc stamp is thicker than a depth of a recessed section defined by said first mold half;
closing a second mold half against said first mold half to form a disc mold, said second mold half defined by a ring-shaped central recessed portion, having a recessed depth of approximately 0.3 millimeters below a main disc recessed outer portion; and
injecting disc substrate raw material into said disc mold.

12. The method of claim 11, wherein said obtaining step comprises obtaining a stamper holder defined by a head having a face wherein said concave portion is discontinuous around the circumference of said concave portion, said concave portion comprising four said concave dome dimples around said circumference, said dimples in relative spaced relation surrounding said central bore.

13. A digital video disc, comprising:
a single piece of material defining:
a generally flat data storage substrate portion defined by an upper surface and a lower surface, said substrate being optically transparent to predetermined light energy, said substrate having a spindle aperture formed therethrough and four thickened dome-shaped portions in relative spaced relation encompassing said spindle aperture extending upwardly from said upper surface; and
a thickened portion defined by a central ring portion encompassing said spindle aperture extending from said lower surface, said central ring portion having a maximum height of approximately 0.3 millimeters, and further defining a flat-topped shape having an outer edge defining a radius from a center defined by said disc, wherein said lower surface central ring portion radius being less than a radius defined by said dome-shaped portions.

14. The disc of claim 13, wherein said generally flat data storage substrate defines a thickness of less than 0.7 millimeters and said thickened portion defines a thickness of at least 1.2 millimeters.

15. The disc of claim 9, further comprising a centering ring extending downwardly from said bottom surface, encompassing said outer edge of said central ring.

16. The method of claim 12, wherein said closing step is further defined by said ring-shaped central recessed portion of said second mold half being defined by a generally flat bottom.

17. The method of claim 16, wherein said closing step is further defined by said central recessed portion of said second mold half being further defined by a centering ring recessed portion surround said flat-bottomed central recessed portion.

18. The disc of claim 13, wherein said central ring is further defined by a centering ring encircling said central ring.

* * * * *